US012706699B2

(12) United States Patent
Zhao

(10) Patent No.: US 12,706,699 B2
(45) Date of Patent: Aug. 11, 2026

(54) PHYSICAL SIDELINK FEEDBACK METHOD AND APPARATUS, AND STORAGE MEDIUM

(71) Applicant: Beijing Xiaomi Mobile Software Co., Ltd., Beijing (CN)

(72) Inventor: Wensu Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 270 days.

(21) Appl. No.: 18/285,707

(22) PCT Filed: Apr. 8, 2021

(86) PCT No.: PCT/CN2021/086033
§ 371 (c)(1),
(2) Date: Oct. 5, 2023

(87) PCT Pub. No.: WO2022/213333
PCT Pub. Date: Oct. 13, 2022

(65) Prior Publication Data
US 2024/0187138 A1 Jun. 6, 2024

(51) Int. Cl.
*H04L 1/1812* (2023.01)
*H04L 5/00* (2006.01)
*H04W 72/40* (2023.01)
*H04W 92/18* (2009.01)

(52) U.S. Cl.
CPC .......... *H04L 1/1812* (2013.01); *H04L 5/0053* (2013.01); *H04W 72/40* (2023.01); *H04W 92/18* (2013.01)

(58) Field of Classification Search
CPC ... H04L 1/1812; H04L 5/0053; H04L 1/1607; H04L 2001/0092; H04L 1/1854; H04L 1/1861; H04L 1/1864; H04L 1/1896; H04L 5/0007; H04L 5/0055; H04L 5/0033; H04W 72/40; H04W 92/18; H04W 4/40; H04W 28/04
USPC ........................................ 370/310, 328, 329
See application file for complete search history.

(56) References Cited

U.S. PATENT DOCUMENTS

| | | | |
|---|---|---|---|
| 10,985,879 B2 | 4/2021 | Wu et al. | |
| 2019/0379489 A1* | 12/2019 | Hwang | H04L 1/0063 |
| 2020/0228247 A1 | 7/2020 | Li et al. | |
| 2020/0344722 A1 | 10/2020 | Papasakellariou et al. | |

(Continued)

FOREIGN PATENT DOCUMENTS

| | | |
|---|---|---|
| CN | 111865485 A | 10/2020 |
| CN | 111867099 A | 10/2020 |

(Continued)

OTHER PUBLICATIONS

ISA State Intellectual Property Office of the People's Republic of China, International Search Report Issued in Application No. PCT/CN2021/086033, Dec. 27, 2021, WIPO, 4 pages.

(Continued)

*Primary Examiner* — Obaidul Huq
(74) *Attorney, Agent, or Firm* — Volpe Koenig

(57) ABSTRACT

Physical sidelink feedback methods and apparatuses, and storage media are provided. The physical sidelink feedback method includes: receiving one or more code block groups CBGs sent by a second user equipment to a first user equipment, and sending HARQ feedback for the one or more CBGs to the second user equipment.

14 Claims, 5 Drawing Sheets

S11

Receive one or more CBGs sent by a second user equipment to the first user equipment

S12

Send HARQ feedback for the one or more CBGs to the second user equipment

(56) References Cited

U.S. PATENT DOCUMENTS

2020/0351032 A1 11/2020 Wu et al.
2020/0374978 A1 11/2020 Shilov et al.
2021/0050950 A1* 2/2021 Zhou .................... H04L 1/1861
2021/0218509 A1 7/2021 Wu et al.
2023/0036504 A1* 2/2023 Sun ...................... H04L 1/1825

FOREIGN PATENT DOCUMENTS

CN 112291046 A * 1/2021 .......... H04L 1/0038
WO 2020143062 A1 7/2020

OTHER PUBLICATIONS

European Patent Office, Extended European Search Report Issued in Application No. 21935563.3, May 3, 2024, Germany, 8 pages.
State Intellectual Property Office of the People's Republic of China, Office Action and Search Report Issued in Application No. 202180001119.9, May 7, 2022, 13 pages.
ISA State Intellectual Property Office of the People's Republic of China, Written Opinion of the International Searching Authority Issued in Application No. PCT/CN2021/086033, Dec. 27, 2021, WIPO, 8 pages.
Indian Office Action issued on Apr. 20, 2026 for Indian Patent Application No. 202317075767.

* cited by examiner

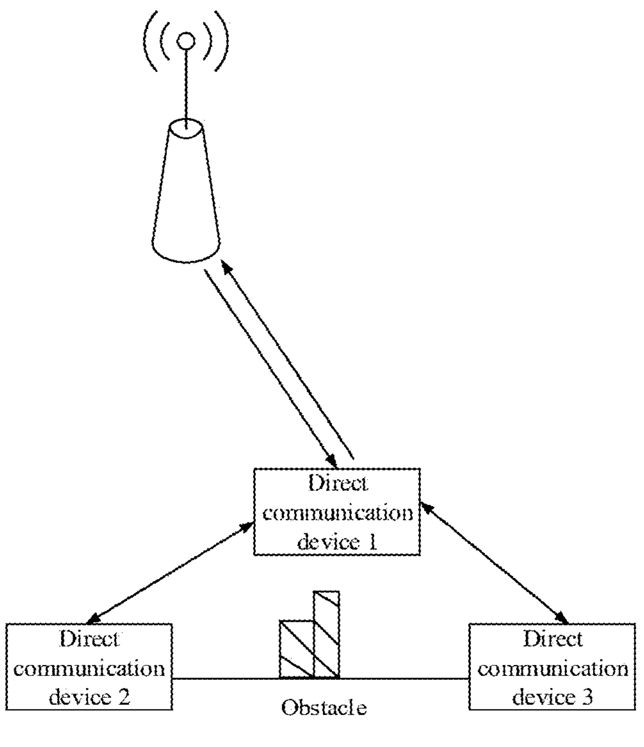
FIG. 1
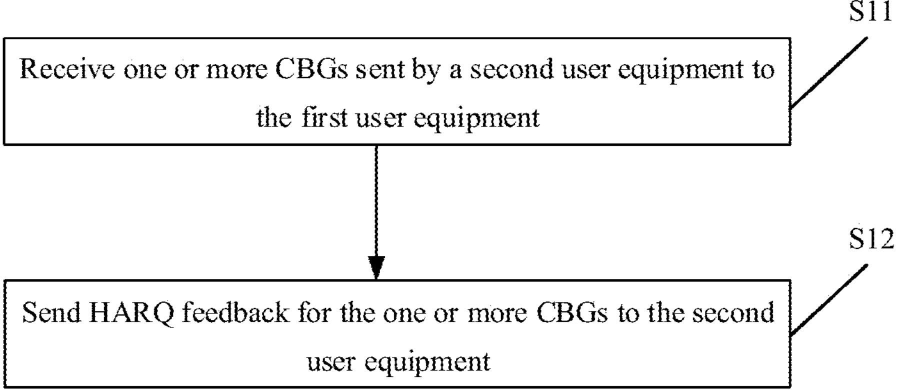
FIG. 2
S21
Send the HARQ feedback for the one or more CBGs to the second user equipment through a first PSFCH format
FIG. 3

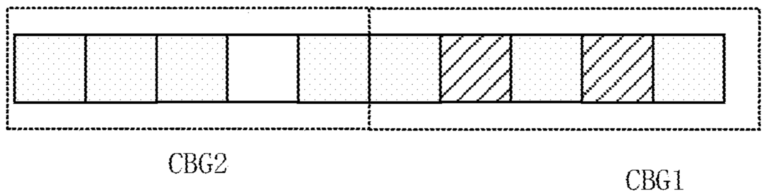

Feedback 10 indicates CBG1 feedback NACK, and CBG2 feedback ACK

Transmission failure

Send the HARQ feedback for the one or more CBGs to the second user equipment based on a PSFCH resource mapped by a PSSCH transmission resource, and the PSFCH resource mapped by the PSSCH transmission resource is determined based on the number of one or more CBGs and a time domain index and a subchannel index where a PSSCH is located

FIG. 5

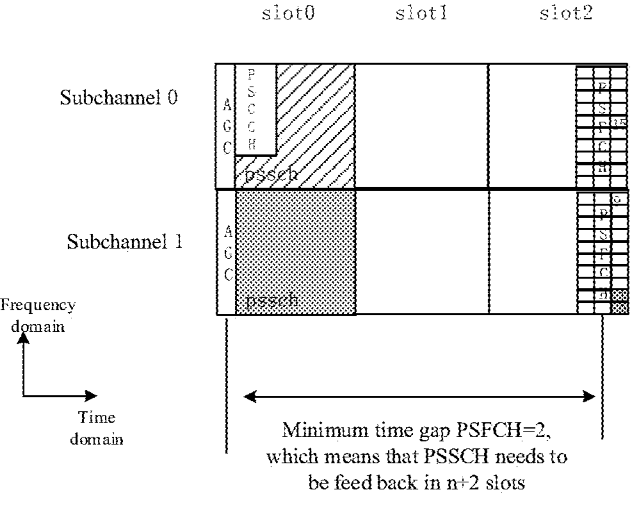

Subchannelsize=10PRB, 16 PRBs for the PSFCH resources are determined by a PRB set indicated by the bitmap (i.e. parameter SL-PSFCH-RB-Set-r16)

A PSSCH with indexes of time slot 0 and subchannel 0 needs to feed back a CBG result of 2 bits. According to this mapping rule, a PSFCH candidate resource set corresponding to the PSSCH includes two PRBs, namely PRBs with PRB serial numbers of 0 and 1.

FIG. 6

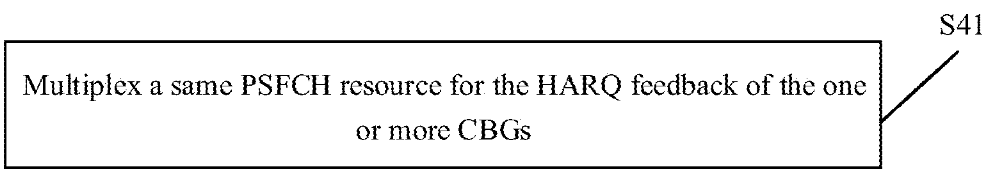
FIG. 7
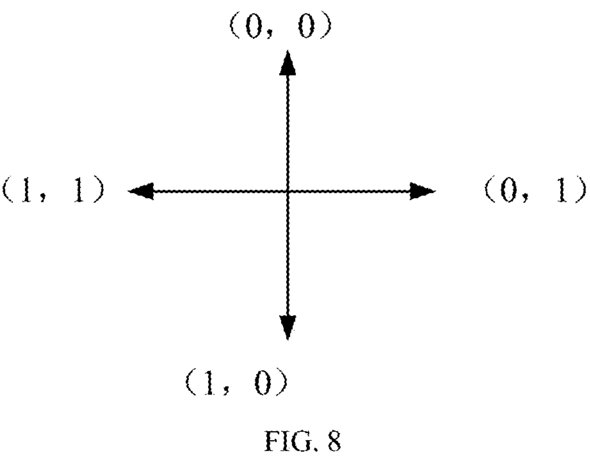
FIG. 8
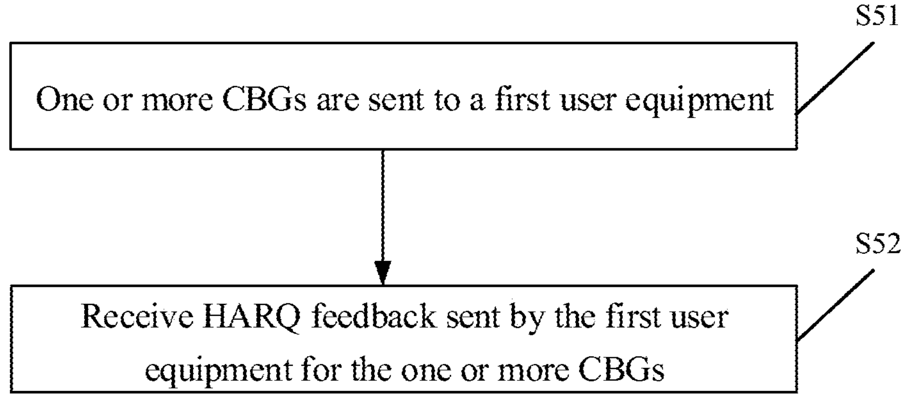
FIG. 9
S61
Receive the HARQ feedback sent by the first user equipment for the one or more CBGs through a first PSFCH format, and the first PSFCH format includes a format that supports to carry one or more HARQ feedback results of the one or more CBGs
FIG. 10

Receive the HARQ feedback sent by the first user equipment for the one or more CBGs based on a PSFCH resource mapped by a PSSCH transmission resource, and the PSFCH resource mapped by the PSSCH transmission resource is determined based on a time domain index and a subchannel index where the PSSCH is located, and the number of one or more CBGs
S71
FIG. 11
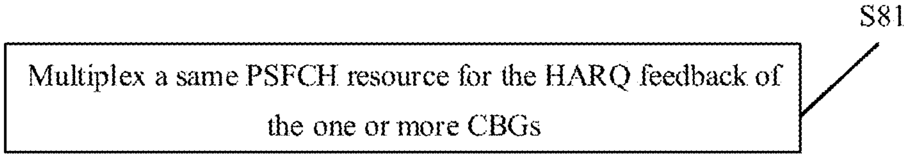
FIG. 12
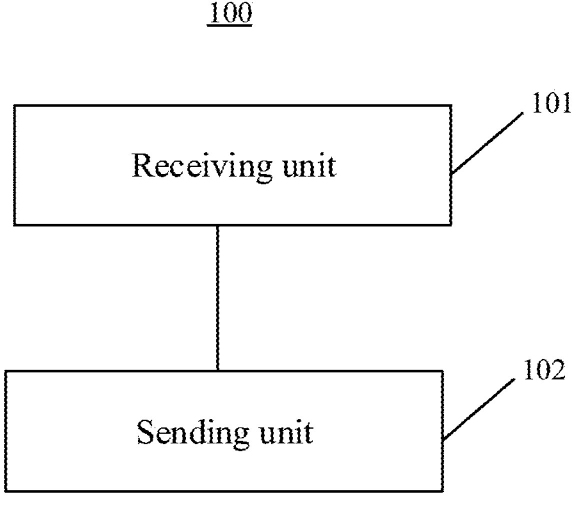
FIG. 13

300
302
Processing component
Processor
320
304
Memory
306
Power component
308
Multimedia component
310
Audio component
316
Communication component
314
Sensor component
Input/output interface
312

PHYSICAL SIDELINK FEEDBACK METHOD AND APPARATUS, AND STORAGE MEDIUM

CROSS-REFERENCE TO RELATED APPLICATION

The present application is a U.S. National Stage of International Application No. PCT/CN2021/086033, filed on Apr. 8, 2021, the contents of which are incorporated herein by reference in their entirety for all purposes.

TECHNICAL FIELD

The present disclosure relates to the field of communication technologies, and in particular to, physical sidelink feedback methods and apparatuses, and storage media.

BACKGROUND

Since long term evolution (LTE), the third generation partnership (3GPP) has been developing a Sidelink standard as a standard for terminal-to-terminal direct communication. In July 2020, the first standard of new radio (NR) Sidelink has been completed in Rel-16, where the solution of NR Sidelink is mainly used for vehicle to everything (V2X) and public safety. For the V2X and public safety, due to time constraints, Release 16 does not fully support service requirements and operation solutions, and service and system aspects (SA) are enhanced in Release 17 NR Sidelink, such as architecture enhancement and system enhancement for 3GPP to support advanced V2X services. In addition, in an SA working group, other business use cases related to NR Sidelink are being studied, e.g., network-controlled interactive services, enhanced energy efficiency relays, wide coverage, and audio-visual service production. Therefore, at the 86th meeting of 3GPP, the enhancement of NR Sidelink was included as a work item in the proposal for Release 17 (R17), with the aim of enhancing the reliability of Sidelink transmission and reducing time delays.

In the enhancement of NR Sidelink, for Sidelink feedback, it is usually based on a retransmission of a transport block (TB), e.g., user equipment B sends a TB to user equipment A, and user equipment A will use a physical sidelink feedback channel (PSFCH) resource to feedback a 1-bit acknowledgement (ACK) or negative acknowledgement (NACK). When transmission fails, and data needs to be retransmitted, the whole TB needs to be retransmitted, which consumes a relatively large amount of sidelink resources.

SUMMARY

In order to overcome the problems existing in the related art, the present disclosure provides physical sidelink feedback methods and apparatuses, and storage media.

According to a first aspect of an embodiment of the present disclosure, a physical sidelink feedback method is provided, which is performed by a first user equipment, and the physical sidelink feedback method includes: receiving one or more code block groups (CBGs) sent by a second user equipment to the first user equipment, sending HARQ feedback for the one or more CBGs to the second user equipment.

According to a second aspect of an embodiment of the present disclosure, a physical sidelink feedback method is provided, which is performed by a second user equipment, including: sending one or more code block groups CBGs to a first user equipment; and receiving HARQ feedback sent by the first user equipment for the one or more CBGs.

According to a third aspect of an embodiment of the present disclosure, a physical sidelink feedback apparatus is provided, including: a processor; and a memory, configured to store processor-executable instructions; where the processor is configured to execute the physical sidelink feedback method described in the first aspect or any one of the implementations of the first aspect.

It should be understood that the above general description and the following detailed descriptions are exemplary and explanatory only and do not limit the present disclosure.

BRIEF DESCRIPTION OF DRAWINGS

The accompanying drawings, which are incorporated in and constitute a part of the specification, illustrate embodiments consistent with the present disclosure, and are used together with the specification to explain the principles of the present disclosure.

FIG. 1 is a communication system schematic diagram according to an embodiment of the present disclosure.

FIG. 2 is a flowchart of a physical sidelink feedback method according to an embodiment of the present disclosure.

FIG. 3 is a flowchart of a physical sidelink feedback method according to an embodiment of the present disclosure.

FIG. 4 illustrates a schematic diagram of HARQ feedback results for CBGs according to an embodiment of the present disclosure.

FIG. 5 is a flowchart of a physical sidelink feedback method according to an embodiment of the present disclosure.

FIG. 6 is a schematic diagram of a resource mapping relationship between a PSSCH and a PSFCH according to an embodiment of the present disclosure.

FIG. 7 is a flowchart of a physical sidelink feedback method according to an embodiment of the present disclosure.

FIG. 8 is a schematic diagram of a physical sidelink feedback cycle shift indication according to an embodiment of the present disclosure.

FIG. 9 is a flowchart of a physical sidelink feedback method according to an embodiment of the present disclosure.

FIG. 10 is a flowchart of a physical sidelink feedback method according to an embodiment of the present disclosure.

FIG. 11 is a flowchart of a physical sidelink feedback method according to an embodiment of the present disclosure.

FIG. 12 is a flowchart of a physical sidelink feedback method according to an embodiment of the present disclosure.

FIG. 13 is a block diagram of a physical sidelink feedback apparatus according to an embodiment of the present disclosure.

DETAILED DESCRIPTION

Figures 14, 15:
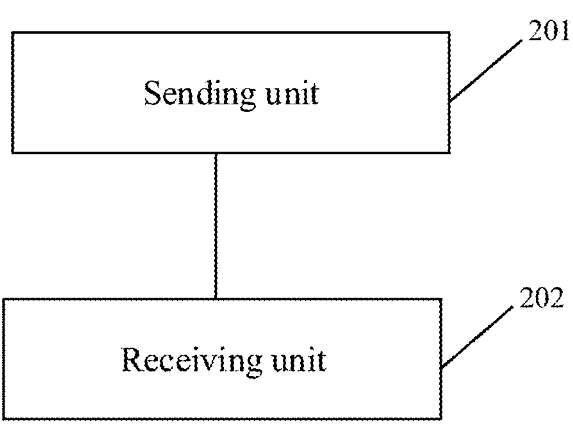
FIG. 14 is a block diagram of a physical sidelink feedback apparatus according to an embodiment of the present disclosure.
FIG. 15 is a block diagram of an apparatus for physical sidelink feedback according to an embodiment of the present disclosure.

Reference will now be made in detail to exemplary embodiments, examples of which are illustrated in the accompanying drawings. When the following description refers to the accompanying drawings, unless otherwise indicated, the same numbers in different accompanying drawings indicate the same or similar elements. Embodiments described in the following exemplary embodiments do not represent all embodiments consistent with the present disclosure. Rather, they are merely examples of apparatuses and methods consistent with some aspects of the present disclosure as detailed in the appended claims.

Embodiments of the present disclosure provide physical sidelink feedback methods that can be applied to a direct communication system shown in FIG. 1. Referring to FIG. 1, in a scenario of direct communication between direct communication devices, a network device 10 configures various transmission parameters for data transmission for direct communication device 1. Direct communication device 1 21, direct communication device 2 22, and direct communication device 3 23 perform direct communications. There may be an obstacle 30 between the direct communication device 2 22 and the direct communication device 3 23. Links between a network device and a direct communication device are uplink and downlink, and a link between a direct communication device and a direct communication device is the sidelink.

In the present disclosure, the communication scenario of direct communication between direct communication devices may be a Vehicle to Everything (V2X) business scenario. V represents an in-vehicle device and X represents any object that interacts with the in-vehicle device. At present, X mainly includes in-vehicle devices, handheld devices, transportation roadside infrastructure and networks. Information modes of V2X interaction include: interactions of Vehicle to Vehicle (V2V), Vehicle to Infrastructure (V2I), Vehicle to Pedestrian (V2P) and Vehicle to Network (V2N).

With the development of next-generation 5G mobile communication technologies, support for new V2X communication services and scenarios such as vehicles platooning, extended sensors, advanced driving, and remote driving are enabled in 3GPP Rel-16 using 5G NR technology. Generally speaking, 5G V2X Sidelink can provide a higher communication rate, a shorter communication delay and more reliable communication quality.

The communication scenario of direct communication between direct communication devices can also be a Device to Device (D2D) communication scenario. Direct communication devices in the embodiments of the present disclosure can include various handheld devices, in-vehicle devices, wearable devices, computing devices, or other processing devices connected to wireless modems, as well as various forms of user equipments (UEs), mobile stations (MSs), terminals, terminal equipments and so on. For convenience of description, the embodiments of the present disclosure will be described below by taking a direct communication device as a user equipment.

In the related art, the enhancement of NR Sidelink is included as a work item with the aim of enhancing the reliability of Sidelink transmission and reducing time delays. In the enhancement of NR Sidelink, at present, only TB-based retransmission can be performed in R17 Sidelink. For example, user equipment B sends a TB to user equipment A, and user equipment A will use PSFCH resources to feedback1-bit ACK or NACK. In the case that the user equipment A feeds back NACK, user equipment B needs to retransmit the whole TB. However, retransmitting the whole TB will consume more Sidelink resources. Therefore, retransmission based on CBG in Sidelink is designed, and one TB can include multiple CBGs. In this way, if the TB transmission fails, only error code block group(s) needs to be retransmitted without retransmitting the whole TB, thus reducing the consumed Sidelink resources.

In view of this, the embodiments of the present disclosure provide a physical sidelink feedback method based on CBG retransmission and feedback, so as to retransmit an error CBG without retransmitting the whole TB in case of TB transmission failure, so that the consumed Sidelink resources are reduced.

The technical solution provided by the embodiments of the present disclosure can include the following beneficial effects: a second user equipment sends one or more code block groups CBGs to a first user equipment, and the first user equipment sends HARQ feedback for the one or more CBGs to the second user equipment. The present disclosure enables CBG-based retransmission as well as HARQ feedback without retransmitting a whole transmission block in sidelink, and therefore reduces the consumption of sidelink resources.

For the convenience of description, in the embodiments of the present disclosure, two devices that perform CBG retransmission as well as hybrid automatic repeat request (HARQ) feedback based on Sidelink are referred to as a first user equipment and a second user equipment. The first user equipment is a user equipment that receives CBGs and sends HARQ feedback, and the second user equipment is a user equipment that sends the CBGs and receives the HARQ feedback.

FIG. 2 is a flowchart of a physical sidelink feedback method according to an embodiment of the present disclosure. As shown in FIG. 2, the physical sidelink feedback method is performed by the first user equipment and includes the following steps.

At step S11, one or more CBGs sent by a second user equipment to the first user equipment are received.

At step S12, HARQ feedback for the one or more CBGs is sent to the second user equipment.

In the embodiment of the present disclosure, the second user equipment sends one or more CBGs to the first user equipment. The one or more CBGs may be CBGs that form a certain TB.

The first user equipment receives one or more CBGs sent by the second user equipment, and feeds back the HARQ feedback to the second user equipment. The HARQ feedback indicates whether the one or more CBGs mentioned above are correctly received.

It can be understood that the HARQ feedback is once in the embodiment of the present disclosure, but the HARQ feedback may contain multiple bits for carrying HARQ feedback result(s) of the one or more CBGs. An HARQ feedback result of a CBG includes receiving the CBG correctly, or not receiving the CBG correctly. That is, the first user equipment may feedback multiple bits of ACK and/or NACK, and each bit corresponds to a feedback result of a CBG. Assuming that N CBGs are configured, it is necessary to design the HARQ feedback with a transmission length of N bits.

In an implementation, the transmission of HARQ feedback results may be performed based on PSFCH resources in the embodiment of the present disclosure. That is, assuming that N CBGs are configured, it is necessary to use PSFCH resources to transmit the HARQ feedback with the length of N bits.

In the physical sidelink feedback method provided by the embodiments of the present disclosure, a PSFCH format is provided, which may be understood to be a PSFCH format that supports to carry HARQ feedback result(s) of the one or more CBGs. For the convenience of description, the PSFCH format supporting to carry the HARQ feedback result(s) of the one or more CBGs can be called a first PSFCH format, and can also be identified as PSFCH format 1.

FIG. 3 is a flowchart of a physical sidelink feedback method according to an embodiment of the present disclosure. As shown in FIG. 3, the physical sidelink feedback method is performed by the first user equipment and includes the following steps.

At step S21, the HARQ feedback for the one or more CBGs is sent to the second user equipment through a first PSFCH format.

The first PSFCH format includes a format that supports to carry HARQ feedback result(s) of the one or more CBGs.

An HARQ feedback result of a CBG includes an ACK or NACK of the CBG.

In an implementation, N bits are transmitted in the first PSFCH format, where the N is the number of the CBGs, and each bit represents a HARQ feedback result corresponding to one CBG.

In an example, in Sidelink, N CBGs are configured, and a value of N is configured by radio resource control (RRC), so a length of one feedback is N bits, and each bit corresponds to a HARQ feedback result of one CBG. FIG. 4 illustrates a schematic diagram of HARQ feedback results for CBGs according to an embodiment of the present disclosure. As shown in FIG. 4, two CBGs are configured. Assuming that a bit value of 0 indicates that the HARQ feedback result is ACK and a bit value of 1 indicates that the HARQ feedback result is NACK, in FIG. 4, bit values of 10 indicates that the HARQ feedback result of a first CBG (CBG1) is NACK, and the first CBG needs to be retransmitted. The HARQ feedback result of a second CBG (CBG2) is ACK, and the second CBG does not need to be retransmitted.

In the embodiment of the present disclosure, the resource used for the first PSFCH format transmission may be a resource determined based on a resource mapping rule. On one hand, a resource for transmitting the first PSFCH format may be determined based on the number of one or more CBGs and a time domain index and a subchannel index where a physical sidelink shared channel (PSSCH) is located. For example, in the embodiment of the present disclosure, a PSFCH resource mapped by a PSSCH transmission resource may be determined based on the time domain index, the subchannel index and the number of one or more CBGs. The HARQ feedback for the one or more CBGs may be sent to the second user equipment based on the PSFCH resource mapped by the PSSCH transmission resource.

FIG. 5 is a flowchart of a physical sidelink feedback method according to an embodiment of the present disclosure. As shown in FIG. 5, the physical sidelink feedback method is performed by the first user equipment and includes the following steps.

At step S31, the HARQ feedback for the one or more CBGs is sent to the second user equipment based on a PSFCH resource mapped by a PSSCH transmission resource.

The PSFCH resource mapped by the PSSCH transmission resource is determined based on a time domain index where the PSSCH is located and a subchannel index where the PSSCH is located, and the number of one or more CBGs.

In the embodiment of the present disclosure, the PSFCH resource mapped by the PSSCH transmission resource includes physical resource blocks (PRBs) consistent with the number of CBGs.

In the embodiment of the present disclosure, it is assumed that the number of CBGs is N, where N≥1. It can be understood that the newly-designed PSFCH format 1 for transmitting N (N≥1) bits CBG feedback results is different from a traditional PSFCH format 0. The traditional PSFCH format 0 transmits one bit, occupying one orthogonal frequency division multiplexing (OFDM) symbol and one PRB. The PSFCH format 1 occupies one OFDM symbol and N PRBs, and supports multi-bit HARQ acknowledgement under CBG retransmission.

In an implementation, in the embodiment of the present disclosure, a PSFCH candidate resource set with N PRBs in a frequency domain can be determined, and in the candidate resource set, according to Formula 1, the resource for transmitting N-bit HARQ feedback by a certain terminal (multiple terminals multiplex the PSFCH resources) can be further determined:

$$PSFCH_{index} = (P_{ID} + M_{ID}) \bmod R_{PRB,CS}^{PSFCH} \quad \text{Formula 1}$$

where $PSFCH_{index}$ is a PSFCH resource index. $P_{ID}$ is a physical layer source ID determined by sidelink control information (SCI) format 2-A or 2-B. When a business type is unicast, $M_{ID}$ is 0. When a business type of 01 uses a multicast (groupcast) HARQ-NACK feedback mechanism, $M_{ID}$ is 0. When the business type of 01 uses a multicast HARQ-NACKVACK feedback, $M_{ID}$ is a multicast member ID of a receiving terminal.

$$R_{PRB,CS}^{PSFCH}$$

represents the number of cycle shifts of ACK/NACK feedback that can be carried in all PRBs in the PSFCH candidate resource set.

In an example, a resource mapping relationship between PSSCH and PSFCH is shown in FIG. 6. A parameter SL-PSFCH-RB-Set-r16 configured by RRC indicates which PRBs on subchannels can be used as resources of PSFCH in a form of bitmap. As in FIG. 6, it is indicated that 0-15 PRBs on subchannels are the resources of PSFCH. Then, for a PSSCH located in subchannel 0 and time slot 0, according to parameters of the time slot index and the subchannel index, it is determined which PRB is used as a candidate resource of PSFCH format 0 among 0-15 PRBs. According to a new resource mapping rule, 2 CBGs are configured for the PSSCH with indexes of time slot 0 and subchannel 0. According to this mapping rule, Subchannelsize=10 PRB, and 16 PRBs for the PSFCH resources are determined by a PRB set indicated by the bitmap (i.e., parameter SL-PSFCH-RB-Set-r16). The number of CBGs for the PSSCH with indexes of time slot 0 and subchannel 0 is 2, that is, it is determined that a PSFCH candidate resource set corresponding to PSSCH includes two PRBs, namely PRBs with PRB serial numbers of 0 and 1, which are candidate resources for transmitting PSFCH format 1.

In another embodiment provided by the embodiment of the present disclosure, a PSFCH resource with the same time-frequency domain may be multiplexed to send the HARQ feedback for the one or more CBGs to the second user equipment.

FIG. 7 is a flowchart of a physical sidelink feedback method according to an embodiment of the present disclosure. As shown in FIG. 7, the physical sidelink feedback method is performed by the first user equipment and includes the following steps.

At step S41, a same PSFCH resource is multiplexed for the HARQ feedback of the one or more CBGs.

In the embodiment of the present disclosure, multiplexing the same PSFCH resource includes multiplexing time domain resources with a same time domain and/or frequency domain resources with a same frequency domain.

In an example, the number of CBGs is N, and transmitting N-bit HARQ feedback results of CBGs can multiplex the same PSFCH resources in the time-frequency domain.

In an implementation, the embodiment of the present disclosure can determine the PSFCH resource(s) for transmission feedback according to an existing mapping rule between the PSSCH and the PSFCH, that is, according to parameters such as a slot index and a subchannel index where the PSSCH is located, and multiplex the PSFCH resource(s) to transmit the N-bit HARQ feedback result of CBGs.

In an implementation, the embodiment of the present disclosure can design a cycle shift to distinguish different HARQ feedback results of CBGs. In an example, the PSFCH resource(s) can be used to send a base sequence that, after cycle shift, indicates different HARQ feedback results of the one or more bits of CBGs through different cycle shifts. That is, the base sequence is sent only once, and after a cycle shift, it represents different feedback results of multiple CBGs. In an example, the base sequence is a sequence with a length of 12.

In an example, if two CBGs are configured, 2 bits need to be transmitted. That is, two pairs of cycle shifts are required, and they are rotated in a unit of $\pi/2$, with a total of four cycle shift values. A cycle shift, as shown in FIG. 8 can be designed. In FIG. 8, in a case where a phase is 0, which means (0, 0), that is, the feedback results of two CBGs are both NACK. In a case where the phase is $\pi/2$, which means (0, 1), that is, the first CBG feedback result is NACK, and the second CBG feedback result is ACK. In a case where the phase is $\pi$, which means (1, 0), that is, the first CBG feedback result is ACK, and the second CBG feedback result is NACK. In a case where the phase is $3\pi/2$, which means (1, 1), that is, the first CBG feedback result is ACK and the second CBG feedback result is ACK.

In an embodiment provided by the present disclosure, the number of CBGs is determined based on a configuration of the resource pool, and the CBG configuration of the resource pool indicates a fixed number of CBGs supported by the resource pool to reduce the complexity of cycle shift design. For example, the CBG configuration based on resource pool is designed in sidelink, which supports {2, 4, 6, 8} CBGs. However, by configuring a fixed number of CBGs for each resource pool through RRC, the design is simple and the design complexity of cycle shift is reduced.

It can be understood that CBG based feedback or TB based feedback can coexist in the embodiment of the present disclosure. For example, the PRB resources for PSFCH are indicated by a bitmap. In Sidelink, it is necessary to support both TB based feedback and CBG based feedback. At this time, RRC configures a set of PRB bitmaps for CBG based feedback resources and TB based feedback resources respectively to ensure coexistence of the two types of feedback. The two use independent feedback resources and introduce two high-level parameters.

SL-PSFCH-RB-TB set is used to indicate a PRB set related to TB feedback.

SL-PSFCH-RB-CBG set is used to indicate a PRB set related to CBG feedback.

Based on the same concept, the embodiment of the present disclosure further provides a physical sidelink feedback method performed by the second user equipment.

FIG. 9 is a flowchart of a physical sidelink feedback method according to an embodiment of the present disclosure. As shown in FIG. 9, the physical sidelink feedback method is performed by the second user equipment and includes the following steps.

At step S51, one or more CBGs are sent to a first user equipment.

At step S52, HARQ feedback sent by the first user equipment for the one or more CBGs is received.

In the embodiment of the present disclosure, the second user equipment sends one or more CBGs to the first user equipment. The one or more CBGs may be CBGs that form a certain TB.

In an implementation, the receipt of HARQ feedback results may be performed based on PSFCH resources in the embodiment of the present disclosure. That is, assuming that N CBGs are configured, it is necessary to use PSFCH resources to receive the HARQ feedback with the length of N bits.

In an implementation, in the physical sidelink feedback method provided by the embodiments of the present disclosure, a PSFCH format is provided, which may be understood to be a PSFCH format that supports to carry HARQ feedback result(s) of the one or more CBGs. For the convenience of description, the PSFCH format supporting to carry the HARQ feedback result(s) of the one or more CBGs can be called a first PSFCH format, and can also be identified as PSFCH format 1.

FIG. 10 is a flowchart of a physical sidelink feedback method according to an embodiment of the present disclosure. As shown in FIG. 10, the physical sidelink feedback method is performed by the second user equipment and includes the following steps.

At step S61, the HARQ feedback sent by the first user equipment for the one or more CBGs is received through a first PSFCH format, where the first PSFCH format includes a format that supports to carry one or more HARQ feedback results of the one or more CBGs.

In an implementation, N bits are transmitted in the first PSFCH format, where the N is the number of the CBGs, and each bit represents a HARQ feedback result corresponding to one CBG.

A HARQ feedback result of a CBG includes an ACK or NACK of the CBG.

In the embodiment of the present disclosure, the resource for receiving the first PSFCH format may be a resource determined based on a resource mapping rule. On one hand, a resource for receiving the first PSFCH format may be determined based on the number of one or more CBGs and a time domain index and a subchannel index where the PSSCH is located.

FIG. 11 is a flowchart of a physical sidelink feedback method according to an embodiment of the present disclosure. As shown in FIG. 11, the physical sidelink feedback method is performed by the second user equipment and includes the following steps.

At step S71, the HARQ feedback sent by the first user equipment for the one or more CBGs is received based on a PSFCH resource mapped by a PSSCH transmission resource. The PSFCH resource mapped by the PSSCH transmission resource is determined based on a time domain index and a subchannel index where the PSSCH is located, and the number of one or more CBGs.

In an implementation, the PSFCH resource mapped by the PSSCH transmission resource includes PRBs consistent with the number of CBGs.

In another embodiment provided by the embodiment of the present disclosure, a PSFCH resource with the same time-frequency domain may be multiplexed to receive the HARQ feedback sent by the first user equipment for the one or more CBGs.

FIG. 12 is a flowchart of a physical sidelink feedback method according to an embodiment of the present disclosure. As shown in FIG. 12, the physical sidelink feedback method is performed by the second user equipment and includes the following steps.

At step S81, a same PSFCH resource is multiplexed for the HARQ feedback of the one or more CBGs.

In the embodiment of the present disclosure, multiplexing the same PSFCH resource includes multiplexing a time domain resource with a same time domain and/or a frequency domain resource with a same frequency domain.

In an embodiment provided by the embodiment of the present disclosure, when multiplexing a PSFCH resource with the same time-frequency domain to receive the HARQ feedback sent by the first user equipment for the one or more CBGs, the PSFCH resource may be used to receive a base sequence, and after the base sequence cycle shifted, it indicates different HARQ feedback results of one or more CBGs.

For example, if there are two CBGs, different cycle shifts represent different HARQ feedback results of the two CBGs. For example, 00, 01, 10, and 11 may represent different HARQ feedback results of two CBGs.

In an embodiment, the number of CBGs is determined based on a configuration of a resource pool, and a CBG configuration of the resource pool indicates a fixed number of CBGs supported by the resource pool.

It can be understood that the physical sidelink feedback method applied to the second user equipment provided by the embodiments of the present disclosure is similar to the physical sidelink feedback method applied to the first user equipment, so if the description of the physical sidelink feedback method applied to the second user equipment is not detailed enough, please refer to the physical sidelink feedback method applied to the first user equipment.

It is further to be understood that the physical sidelink feedback method provided by the embodiments of the present disclosure is applicable to a process of realizing physical sidelink feedback during interaction between the first user equipment and the second user equipment. The embodiment of the present disclosure will not describe in detail the process of realizing physical sidelink feedback during interaction between the first user equipment and the second user equipment.

It should be noted that those skilled in the art can understand that the above-mentioned various implementations/examples of the embodiments of the present disclosure can be used together with the aforementioned embodiments or independently. Whether used alone or in combination with the aforementioned embodiments, the implementation principle is similar. In the implementation of the present disclosure, some embodiments are explained in a way of using them together. Of course, those skilled in the art can understand that such examples are not limiting the embodiments of the present disclosure.

Based on the same/similar concept, embodiments of the present disclosure further provides a physical sidelink feedback apparatus.

It can be understood that, in order to realize the above functions, the physical sidelink feedback apparatus provided by the embodiments of the present disclosure includes corresponding hardware structures and/or software modules for performing various functions. Combining the units and algorithm steps of various examples in embodiments of the present disclosure, the embodiments of the present disclosure can be realized in the form of hardware or a combination of hardware and computer software. Whether a function is executed by hardware or computer software drives hardware depends on the specific application and design constraints of the technical solution. Those skilled in the art can use different methods to realize the described functions for each specific application, but such implementation should not be considered beyond the scope of the technical solution of the embodiments of the present disclosure.

FIG. 13 is a block diagram of a physical sidelink feedback apparatus according to an embodiment of the present disclosure. Referring to FIG. 13, the physical sidelink feedback apparatus 100 includes a receiving unit 101 and a sending unit 102.

The receiving unit 101 is configured to receive one or more CBGs sent by a second user equipment to a first user equipment. The sending unit 102 is configured to send HARQ feedback for the one or more CBGs to the second user equipment.

In an implementation, the sending unit 102 sends the HARQ feedback for the one or more CBGs to the second user equipment through a first PSFCH format. The first PSFCH format includes a format that supports to carry one or more HARQ feedback results of the one or more CBGs.

In an implementation, N bits are transmitted in the first PSFCH format, where the N is a number of the CBGs, and each bit represents a HARQ feedback result corresponding to one CBG.

In an implementation, the sending unit 102 sends the HARQ feedback for the one or more CBGs to the second user equipment based on a PSFCH resource mapped by a PSSCH transmission resource. The PSFCH resource mapped by the PSSCH transmission resource is determined based on the number of one or more CBGs, a time domain index, and a subchannel index where a PSSCH is located.

In an implementation, the PSFCH resource mapped by the PSSCH transmission resource includes PRBs consistent with the number of CBGs.

In an implementation, an index of the PSFCH resource mapped by the PSSCH transmission resource satisfies the following formula:

$$PSFCH_{index} = (P_{ID} + M_{ID}) \bmod R_{PRB,CS}^{PSFCH}$$

where $PSFCH_{index}$ represents a PSFCH resource index, $P_{ID}$ represents a physical layer resource identifier determined by a sidelink control information format, $M_{ID}$ represents a value determined by a corresponding business type, $$R_{PRB,CS}^{PSFCH}$$

represents a number of cycle shifts of ACK/NACK feedback that is capable of carrying by a plurality of PRBs in a PSFCH candidate resource, and a number of the plurality of PRBs is consistent with the number of CBGs.

In an implementation, the sending unit 102 multiplexes a same PSFCH resource for the HARQ feedback of the one or more CBGs.

In an implementation, the sending unit 102 sends a base sequence using the PSFCH resource, and the base sequence indicates different HARQ feedback results of the one or more CBGs.

In an embodiment, the number of CBGs is determined based on a configuration of a resource pool, and a CBG configuration of the resource pool indicates a fixed number of CBGs supported by the resource pool.

FIG. 14 is a block diagram of a physical sidelink feedback apparatus according to an embodiment of the present disclosure. Referring to FIG. 14, the physical sidelink feedback apparatus 200 includes a sending unit 201 and a receiving unit 202.

The sending unit 201 is configured to send one or more CBGs to a first user equipment. The receiving unit 202 is configured to receive HARQ feedback sent by the first user equipment for the one or more CBGs.

In an implementation, the receiving unit 202 receives the HARQ feedback for the one or more CBGs sent by the first user equipment for the one or more CBGs through a first PSFCH format. The first PSFCH format includes a format that supports to carry one or more HARQ feedback results of the one or more CBGs.

In an implementation, N bits are transmitted in the first PSFCH format, where the N is a number of the CBGs, and each bit represents a HARQ feedback result corresponding to one CBG.

In an implementation, the receiving unit 202 receives the HARQ feedback sent by the first user equipment for the one or more CBGs based on a PSFCH resource mapped by a PSSCH transmission resource. The PSFCH resource mapped by the PSSCH transmission resource is determined based on the number of one or more CBGs and a time domain index and a subchannel index where a PSSCH is located.

In an implementation, the PSFCH resource mapped by the PSSCH transmission resource includes PRBs consistent with the number of CBGs.

In an implementation, the receiving unit 202 multiplexes a same PSFCH resource for the HARQ feedback of the one or more CBGs.

In an implementation, the receiving unit 202 receives a base sequence using the PSFCH resource. The base sequence indicates different HARQ feedback results of the one or more CBGs after cycle shift.

In an implementation, the number of CBGs is determined based on a configuration of the resource pool, and a CBG configuration of the resource pool indicates a fixed number of CBGs supported by the resource pool.

Regarding the apparatus in the above embodiment, a specific way in which each module performs operations has been described in detail in the embodiments relating to the method, and will not be described in detail here.

FIG. 15 is a block diagram of an apparatus for physical sidelink feedback according to an embodiment of the present disclosure. For example, the apparatus 300 can be the first user equipment or the second user equipment involved in the above embodiment, such as a mobile phone, a computer, a digital broadcasting terminal, a messaging device, a game console, a tablet device, a medical device, a fitness device, a personal digital assistant, etc.

Referring to FIG. 15, the apparatus 300 may include one or more of the following components: a processing component 302, a memory 304, a power component 306, a multimedia component 308, an audio component 310, an input/output (I/O) interface 312, a sensor component 314, and a communication component 316.

The processing component 302 generally controls the overall operation of the apparatus 300, such as operations associated with display, telephone call, data communication, camera operation, and recording operation. The processing component 302 may include one or more processors 320 to execute instructions to complete all or part of the steps of the above-mentioned method. In addition, the processing component 302 may include one or more modules to facilitate interactions between the processing component 302 and other components. For example, the processing component 302 may include a multimedia module to facilitate interactions between the multimedia component 308 and the processing component 302.

The memory 304 is configured to store various types of data to support operations in the apparatus 300. Examples of these data include instructions of any application program or method for being operated on the apparatus 300, contact data, phone book data, messages, pictures, videos, etc. The memory 304 can be implemented by any type of volatile or non-volatile memory device or combinations thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 306 provides power to various components of the apparatus 300. The power component 306 may include a power management system, one or more power supplies, and other components associated with generating, managing, and distributing power for the apparatus 300.

The multimedia component 308 includes a screen that provides an output interface between the apparatus 300 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touching, sliding and gestures on the touch panel. The touch sensor may not only sense a boundary of a touching or sliding action, but also detect a duration and a pressure related to the touching or sliding operation. In some embodiments, the multimedia component 308 includes a front camera and/or a rear camera. When the apparatus 300 is in an operation mode, such as a shooting mode or a video mode, the front camera and/or the rear camera can receive external multimedia data. Each front camera and rear camera may be a fixed optical lens system or have a focal length and optical zoom capability.

The audio component 310 is configured to output and/or input audio signals. For example, the audio component 310 includes a microphone (MIC) configured to receive external audio signals when the apparatus 300 is in the operation mode, such as a calling mode, a recording mode, and a voice recognition mode. The received audio signal may be further stored in the memory 304 or transmitted via the communication component 316. In some embodiments, the audio component 310 further includes a speaker for outputting audio signals.

The I/O interface 312 provides an interface between the processing component 302 and peripheral interface modules, where the peripheral interface modules may be keyboards, click-wheels, buttons, etc. These buttons may include, but are not limited to: home button, volume button, start button and lock button.

The sensor component 314 includes one or more sensors for providing various aspects of state evaluation for the apparatus 300. For example, the sensor component 314 can detect an on/off state of the apparatus 300, a relative positioning of components, for example, the components are the display and the keypad of the apparatus 300, and the sensor component 314 can also detect a position change of the apparatus 300 or a component of the apparatus 300, presence or absence of user contact with the apparatus 300, orientation or acceleration/deceleration of the apparatus 300 and a temperature change of the apparatus 300. The sensor component 314 may include a proximity sensor configured to detect the presence of a nearby object without any physical contact. The sensor component 314 may also include an optical sensor, such as a CMOS or CCD image sensor, for use in imaging applications. In some embodiments, the sensor component 314 may further include an acceleration sensor, a gyroscope sensor, a magnetic sensor, a pressure sensor or a temperature sensor.

The communication component 316 is configured to facilitate wired or wireless communication between the apparatus 300 and other devices. The apparatus 300 can access a wireless network based on communication standards, such as WiFi, 2G or 3G, or combinations thereof. In an exemplary embodiment, the communication component 316 receives a broadcast signal or broadcast related information from an external broadcast management system via a broadcast channel. In an exemplary embodiment, the communication component 316 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology, and other technologies.

In an exemplary embodiment, the apparatus 300 may be implemented by one or more application-specific integrated circuits (ASIC), digital signal processors (DSP), digital signal processing devices (DSPD), programmable logic devices (PLD), field programmable gate arrays (FPGA), controllers, micro-controllers, micro-processors or other electronic components, for executing the above-mentioned method.

In an exemplary embodiment, a non-transitory computer-readable storage medium is further provided, such as the memory 304 including instructions, where the instructions can be executed by a processor 320 of the apparatus 300 to complete the above-mentioned delay determination method. For example, the non-transitory computer-readable storage medium may be an ROM, a random access memory (RAM), a CD-ROM, a magnetic tape, a floppy disk, an optical data storage device, etc.

According to a first aspect of an embodiment of the present disclosure, a physical sidelink feedback method is provided, which is performed by a first user equipment, and the physical sidelink feedback method includes: in response to receiving one or more code block groups (CBGs) sent by a second user equipment to the first user equipment, sending HARQ feedback for the one or more CBGs to the second user equipment.

In an implementation, sending the HARQ feedback for the one or more CBGs to the second user equipment includes: sending the HARQ feedback for the one or more CBGs to a second user equipment through a first PSFCH format; where the first PSFCH format includes a format that supports to carry one or more HARQ feedback results of the one or more CBGs.

In an implementation, N bits are transmitted in the first PSFCH format, where the N is a number of the CBGs, and each bit represents a HARQ feedback result corresponding to one CBG.

In an implementation, sending the HARQ feedback for the one or more CBGs to the second user equipment includes: sending the HARQ feedback for the one or more CBGs to the second user equipment based on a PSFCH resource mapped by a PSSCH transmission resource; where the PSFCH resource mapped by the PSSCH transmission resource is determined based on the number of one or more CBGs and a time domain index and a subchannel index where a PSSCH is located.

In an implementation, the PSFCH resource mapped by the PSSCH transmission resource includes PRBs consistent with the number of CBGs.

In an implementation, an index of the PSFCH resource mapped by the PSSCH transmission resource satisfies the following formula:

$$PSFCH_{index} = (P_{ID} + M_{ID}) \bmod R_{PRB,CS}^{PSFCH}$$

where $PSFCH_{index}$ represents the index of the PSFCH resource, $P_{ID}$ represents a physical layer resource identifier determined by a sidelink control information format, $M_{ID}$ represents a value determined by a corresponding business type, $$R_{PRB,CS}^{PSFCH}$$

represents a number of cycle shifts of ACK/NACK feedback that is capable of carrying by a plurality of PRBs in a PSFCH candidate resource, and a number of the plurality of PRBs is consistent with the number of CBGs.

In an implementation, sending the HARQ feedback for the one or more CBGs to the second user equipment includes: multiplexing a same PSFCH resource for the HARQ feedback of the one or more CBGs.

In an implementation, multiplexing the same PSFCH resource for the HARQ feedback of the one or more CBGs includes: sending a base sequence using the PSFCH resource; where the base sequence indicates different HARQ feedback results of the one or more CBGs after cycle shift.

In an implementation, the number of CBGs is determined based on a configuration of a resource pool, and a CBG configuration of the resource pool indicates a fixed number of CBGs supported by the resource pool.

According to a second aspect of an embodiment of the present disclosure, a physical sidelink feedback method is provided, which is performed by a second user equipment, including: sending one or more code block groups CBGs to a first user equipment; and receiving HARQ feedback sent by the first user equipment for the one or more CBGs.

In an implementation, receiving the HARQ feedback sent by the first user equipment for the one or more CBGs includes: receiving the HARQ feedback sent by the first user equipment for the one or more CBGs through a first PSFCH format; where the first PSFCH format includes a format that supports to carry one or more HARQ feedback results of the one or more CBGs.

In an implementation, N bits are transmitted in the first PSFCH format, where the N is a number of the CBGs, and each bit represents a HARQ feedback result corresponding to one CBG.

In an implementation, receiving the HARQ feedback sent by the first user equipment for the one or more CBGs includes: receiving the HARQ feedback sent by the first user equipment for the one or more CBGs based on a PSFCH resource mapped by a PSSCH transmission resource; where the PSFCH resource mapped by the PSSCH transmission resource is determined based on the number of one or more CBGs and a time domain index and a subchannel index where a PSSCH is located.

In an implementation, the PSFCH resource mapped by the PSSCH transmission resource includes PRBs consistent with the number of CBGs.

In an implementation, an index of the PSFCH resource mapped by the PSSCH transmission resource satisfies the following formula:

$$PSFCH_{index} = (P_{ID} + M_{ID}) \bmod R_{PRB,CS}^{PSFCH}$$

where $PSFCH_{index}$ represents the index of the PSFCH resource, $P_{ID}$ represents a physical layer resource identifier determined by a sidelink control information format, $M_{ID}$ represents a value determined by a corresponding business type, $$R_{PRB,CS}^{PSFCH}$$

represents a number of cycle shifts of ACK/NACK feedback that is capable of carrying by a plurality of PRBs in a PSFCH candidate resource, and a number of the plurality of PRBs is consistent with the number of CBGs.

In an implementation, receiving the HARQ feedback sent by the first user equipment for the one or more CBGs includes: multiplexing a same PSFCH resource for the HARQ feedback of the one or more CBGs.

In an implementation, multiplexing the same PSFCH resource for the HARQ feedback of the one or more CBGs includes: receiving a base sequence using the PSFCH resource; where the base sequence indicates different HARQ feedback results of the one or more CBGs after a cycle shift.

In an implementation, the number of CBGs is determined based on a configuration of a resource pool, and a CBG configuration of the resource pool indicates a fixed number of CBGs supported by the resource pool.

According to a third aspect of an embodiment of the present disclosure, a physical sidelink feedback apparatus is provided, which is performed by a first user equipment, including: a receiving unit, configured to receive one or more code block groups CBGs sent by a second user equipment to the first user equipment, and a sending unit, configured to send HARQ feedback for the one or more CBGs to the second user equipment.

In an implementation, the sending unit sends the HARQ feedback for the one or more CBGs to the second user equipment through a first PSFCH format, where the first PSFCH format includes a format that supports to carry one or more HARQ feedback results of the one or more CBGs.

In an implementation, N bits are transmitted in the first PSFCH format, where the N is a number of the CBGs, and each bit represents a HARQ feedback result corresponding to one CBG.

In an implementation, the sending unit sends the HARQ feedback for the one or more CBGs to the second user equipment based on the PSFCH resource mapped by the PSSCH transmission resource; where the PSFCH resource mapped by the PSSCH transmission resource is determined based on the number of one or more CBGs and a time domain index and a subchannel index where a PSSCH is located.

In an implementation, the PSFCH resource mapped by the PSSCH transmission resource includes PRBs consistent with the number of CBGs.

In an implementation, an index of the PSFCH resource mapped by the PSSCH transmission resource satisfies the following formula:

$$PSFCH_{index} = (P_{ID} + M_{ID}) \bmod R_{PRB,CS}^{PSFCH}$$

where $PSFCH_{index}$ represents the index of the PSFCH resource, $P_{ID}$ represents a physical layer resource identifier determined by a sidelink control information format, $M_{ID}$ represents a value determined by a corresponding business type, $$R_{PRB,CS}^{PSFCH}$$

represents a number of cycle shifts of ACK/NACK feedback that is capable of carrying by a plurality of PRBs in a PSFCH candidate resource, and a number of the plurality of PRBs is consistent with the number of CBGs.

In an implementation, the sending unit multiplexes a same PSFCH resource for the HARQ feedback of the one or more CBGs.

In an implementation, the sending unit sends a base sequence using the PSFCH resource; where the base sequence indicates different HARQ feedback results of the one or more CBGs after cycle shift.

In an implementation, the number of CBGs is determined based on a configuration of a resource pool, and a CBG configuration of the resource pool indicates a fixed number of CBGs supported by the resource pool.

According to a fourth aspect of an embodiment of the present disclosure, a physical sidelink feedback apparatus is provided, which is performed by a second user equipment, including: a sending unit, configured to send one or more code block groups CBGs to a first user equipment; and a receiving unit, configured to receive HARQ feedback sent by the first user equipment for the one or more CBGs.

In an implementation, the receiving unit receives the HARQ feedback sent by the first user equipment for the one or more CBGs through a first PSFCH format, where the first PSFCH format includes a format that supports to carry one or more HARQ feedback results of the one or more CBGs.

In an implementation, N bits are transmitted in the first PSFCH format, where the N is a number of the CBGs, and each bit represents a HARQ feedback result corresponding to one CBG.

In an implementation, the receiving unit receives the HARQ feedback sent by the first user equipment for the one or more CBGs based on a PSFCH resource mapped by a PSSCH transmission resource; where the PSFCH resource mapped by the PSSCH transmission resource is determined based on the number of one or more CBGs and a time domain index and a subchannel index where a PSSCH is located.

In an implementation, the PSFCH resource mapped by the PSSCH transmission resource includes PRBs consistent with the number of CBGs.

In an implementation, an index of the PSFCH resource mapped by the PSSCH transmission resource satisfies the following formula:

$$PSFCH_{index} = (P_{ID} + M_{ID}) \bmod R_{PRB,CS}^{PSFCH}$$

where $PSFCH_{index}$ represents the index of the PSFCH resource index, $P_{ID}$ represents a physical layer resource identifier determined by a sidelink control information format, $M_{ID}$ represents a value determined by a corresponding business type, $$R_{PRB,CS}^{PSFCH}$$

represents a number of cycle shifts of ACK/NACK feedback that is capable of carrying by a plurality of PRBs in a PSFCH candidate resource, and a number of the plurality of PRBs is consistent with the number of CBGs.

In an implementation, the receiving unit multiplexes a same PSFCH resource for the HARQ feedback of the one or more CBGs.

In an implementation, the receiving unit receives a base sequence using the PSFCH resource; where the base sequence indicates different HARQ feedback results of the one or more CBGs after cycle shift.

In an implementation, the number of CBGs is determined based on a configuration of a resource pool, and a CBG configuration of the resource pool indicates a fixed number of CBGs supported by the resource pool.

According to a fifth aspect of an embodiment of the present disclosure, a physical sidelink feedback apparatus is provided, including: a processor; and a memory, configured to store processor-executable instructions; where the processor is configured to execute the physical sidelink feedback method described in the first aspect or any one of the implementations of the first aspect.

According to a sixth aspect of an embodiment of the present disclosure, a physical sidelink feedback apparatus is provided, including: a processor; and a memory, configured to store processor-executable instructions; where the processor is configured to execute the physical sidelink feedback method described in the second aspect or any one of the implementations of the second aspect.

According to a seventh aspect of an embodiment of the present disclosure, a storage medium is provided, where instructions are stored in the storage medium, and when the instructions in the storage medium are executed by a processor of a user equipment, the user equipment can execute the physical sidelink feedback method described in the first aspect or any one of the implementations of the first aspect.

According to an eighth aspect of an embodiment of the present disclosure, a storage medium is provided, where instructions are stored in the storage medium, and when the instructions in the storage medium are executed by a processor of a user equipment, the user equipment can execute the physical sidelink feedback method described in the second aspect or any one of the implementations of the second aspect.

It can be further understood that "plurality" in the present disclosure means two or more, and that other quantifiers are similar. "And/or", which describes the relationship of related objects, means that there can be three kinds of relationships, for example, A and/or B, which can mean that A exists alone, A and B exist together, and B exists alone. The character "/" generally indicates that the associated object is an "or" relationship. Singular forms of "a", "said", and "the" are also intended to include majority forms, unless the context clearly indicates otherwise.

It can be further understood that the terms "first", "second", etc. may be used to describe various information, but this information should not be limited to these terms. These terms are used only to distinguish the same type of information from one another and do not indicate a specific order or degree of importance. In fact, expressions such as "first" and "second" can be used interchangeably. For example, without departing from the scope of the present disclosure, first information can also be called second information, and similarly, the second information can also be called the first information.

It can be further understood that although the operations are described in a specific order in the accompanying drawings in the embodiments of the present disclosure, it should not be understood as requiring that these operations be performed in the specific order or serial order shown, or that all the operations shown should be performed to obtain the desired results. In certain circumstances, multitasking and parallel processing may be beneficial.

Other embodiments of the present disclosure will easily occur to those skilled in the art after considering the specification and practicing the present disclosure disclosed herein. The present disclosure is intended to cover any variations, uses, or adaptations of the present disclosure, and these variations, uses, or adaptations follow general principles of the present disclosure and include common sense or common technical means in the technical field that are not disclosed in the present disclosure. The specification and embodiments are to be regarded as exemplary only, and the true scope and spirit of the present disclosure are indicated by the following claims.

It should be understood that the present disclosure is not limited to precise structures described above and shown in the accompanying drawings, and various modifications and changes can be made without departing from its scope. The scope of the present disclosure is limited only by the appended claims.

The invention claimed is:

1. A physical sidelink feedback method, performed by a first user equipment, comprising:

receiving one or more code block groups (CBGs) sent by a second user equipment to the first user equipment, and determining a physical sidelink feedback channel (PSFCH) resource mapped by a physical sidelink shared channel (PSSCH) transmission resource, wherein the PSFCH resource is used to send hybrid automatic repeat request (HARQ) feedback for the one or more CBGs;

sending, based on the PSFCH resource, the HARQ feedback for the one or more CBGs to the second user equipment;

wherein the PSFCH resource comprises: different PSFCH resources used for the HARQ feedback for the one or more CBGs, wherein the PSFCH resource mapped by the PSSCH transmission resource is determined based on a number of one or more CBGs and a time domain index and a subchannel index where a PSSCH is located, and the PSFCH resource mapped by the PSSCH transmission resource comprises physical resource blocks (PRBs) consistent with the number of the CBGs; or, a same PSFCH resource multiplexed for the HARQ feedback for the one or more CBGs.

2. The physical sidelink feedback method according to claim 1, wherein sending the HARQ feedback for the one or more CBGs to the second user equipment comprises:

sending the HARQ feedback for the one or more CBGs to the second user equipment through a first PSFCH format; and wherein the first PSFCH format comprises a format that supports to carry one or more HARQ feedback results of the one or more CBGs.

3. The physical sidelink feedback method according to claim 2, wherein N bits are transmitted in the first PSFCH format, the N is the number of the CBGs, and each bit represents a HARQ feedback result corresponding to one CBG.

4. The physical sidelink feedback method according to claim 1, wherein an index of the PSFCH resource mapped by the PSSCH transmission resource satisfies a following formula:

$$PSFCH_{index} = (P_{ID} + M_{ID}) \bmod R_{PRB,CS}^{PSFCH}$$

wherein $PSFCH_{index}$ represents the index of the PSFCH resource, $P_{ID}$ represents a physical layer resource identifier determined by a sidelink control information format, $M_{ID}$ represents a value determined by a corresponding business type, $$R_{PRB,CS}^{PSFCH}$$

represents a number of cycle shifts of acknowledgement (ACK)/negative acknowledgement (NACK) feedback that is capable of carrying by a plurality of PRBs in a PSFCH candidate resource, and a number of the plurality of PRBs is consistent with the number of CBGs.

5. The physical sidelink feedback method according to claim 1, wherein multiplexing the same PSFCH resource for the HARQ feedback of the one or more CBGs comprises:

sending a base sequence using the PSFCH resource; and wherein the base sequence indicates different HARQ feedback results of the one or more CBGs after cycle shift.

6. The physical sidelink feedback method according to claim 1, wherein the number of CBGs is determined based on a configuration of a resource pool, and a CBG configuration of the resource pool indicates a fixed number of CBGs supported by the resource pool.

7. A physical sidelink feedback method, performed by a second user equipment, comprising:

sending one or more code block groups (CBGs) to a first user equipment; and receiving, based on a physical sidelink feedback channel (PSFCH) resource mapped by a physical sidelink shared channel (PSSCH) transmission resource, hybrid automatic repeat request (HARQ) feedback sent by the first user equipment for the one or more CBGs; and wherein the PSFCH resource comprises: different PSFCH resources used for the HARQ feedback for the one or more CBGs, wherein the PSFCH resource mapped by the PSSCH transmission resource is determined based on a number of one or more CBGs and a time domain index and a subchannel index where a PSSCH is located, and the PSFCH resource mapped by the PSSCH transmission resource comprises physical resource blocks (PRBs) consistent with the number of the CBGs; or, a same PSFCH resource multiplexed for the HARQ feedback for the one or more CBGs.

8. The physical sidelink feedback method according to claim 7, wherein receiving the HARQ feedback sent by the first user equipment for the one or more CBGs comprises:

receiving the HARQ feedback sent by the first user equipment for the one or more CBGs through a first PSFCH format;

wherein the first PSFCH format comprises a format that supports to carry one or more HARQ feedback results of the one or more CBGs.

9. The physical sidelink feedback method according to claim 8, wherein N bits are transmitted in the first PSFCH format, the N is the number of the CBGs, and each bit represents a HARQ feedback result corresponding to one CBG.

10. The physical sidelink feedback method according to claim 7, wherein an index of the PSFCH resource mapped by the PSSCH transmission resource satisfies a following formula:

$$PSFCH_{index} = (P_{ID} + M_{ID}) \bmod R_{PRB,CS}^{PSFCH}$$

wherein $PSFCH_{index}$ represents the index of the PSFCH resource, $P_{ID}$ represents a physical layer resource identifier determined by a sidelink control information format, $M_{ID}$ represents a value determined by a corresponding business type, $$R_{PRB,CS}^{PSFCH}$$

represents a number or cycle shifts of acknowledgement (ACK)/negative acknowledgement (NACK) feedback that is capable of carrying by a plurality of PRBs in a PSFCH candidate resource, and a number of the plurality of PRBs is consistent with the number of CBGs.

11. The physical sidelink feedback method according to claim 7, wherein multiplexing the same PSFCH resource for the HARQ feedback of the one or more CBGs comprises:

receiving a base sequence using the PSFCH resource; and wherein the base sequence indicates different HARQ feedback results of the one or more CBGs after cycle shift.

12. The physical sidelink feedback method according to claim 7, wherein the number of CBGs is determined based on a configuration of a resource pool, and a CBG configuration of the resource pool indicates a fixed number of CBGs supported by the resource pool.

13. A physical sidelink feedback apparatus, comprising:

a processor; and a memory, configured to store processor-executable instructions;

wherein the processor is configured to execute the physical sidelink feedback method according to claim 7.

14. A physical sidelink feedback apparatus, comprising:

a processor; and a memory, configured to store processor-executable instructions;

wherein the processor is configured to receive one or more code block groups (CBGs) sent by a second user equipment to a first user equipment, and determine a physical sidelink feedback channel (PSFCH) resource mapped by a physical sidelink shared channel (PSSCH) transmission resource, wherein the PSFCH resource is used to send hybrid automatic repeat request (HARQ) feedback for the one or more CBGs;

send, based on the PSFCH resource, the (HARQ feedback for the one or more CBGs to the second user equipment;

wherein the PSFCH resource comprises: different PSFCH resources used for the HARQ feedback for the one or more CBGs, wherein the PSFCH resource mapped by the PSSCH transmission resource is determined based on a number of one or more CBGs and a time domain index and a subchannel index where a PSSCH is located, and the PSFCH resource mapped by the PSSCH transmission resource comprises physical resource blocks (PRBs) consistent with the number of the CBGs; or, a same PSFCH resource multiplexed for the HARQ feedback for the one or more CBGs.

* * * * *